US008868075B2

(12) United States Patent
Sherman et al.

(10) Patent No.: US 8,868,075 B2
(45) Date of Patent: Oct. 21, 2014

(54) MODULAR CELL PHONE FOR FIXED MOBILE CONVERGENCE

(75) Inventors: Itay Sherman, Hod Hasharon (IL); Eyal Bychkov, Hod Hasharon (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 747 days.

(21) Appl. No.: 12/415,116

(22) Filed: Mar. 31, 2009

(65) Prior Publication Data

US 2009/0252117 A1 Oct. 8, 2009

Related U.S. Application Data

(60) Provisional application No. 61/043,179, filed on Apr. 8, 2008.

(51) Int. Cl.
| | |
|---|---|
| *H04W 36/00* | (2009.01) |
| *H04W 36/14* | (2009.01) |
| *H04W 84/04* | (2009.01) |
| *H04W 84/12* | (2009.01) |
| *H04W 92/18* | (2009.01) |

(52) U.S. Cl.
CPC ............ *H04W 36/14* (2013.01); *H04W 84/042* (2013.01); *H04W 84/12* (2013.01); *H04W 92/18* (2013.01)
USPC .......................................... 455/436; 370/331

(58) Field of Classification Search
CPC ..... H04W 16/16; H04W 36/00; H04W 36/06; H04W 36/08; H04W 36/12; H04W 36/14; H04W 36/16; H04W 36/18; H04W 36/34; H04W 36/36
USPC .......................................... 455/436; 370/331
See application file for complete search history.

(56) References Cited

U.S. PATENT DOCUMENTS

| 5,625,673 | A | 4/1997 | Grewe et al. |
|---|---|---|---|
| 5,628,055 | A | 5/1997 | Stein |
| 5,809,115 | A | 9/1998 | Inkinen |
| 5,893,037 | A | 4/1999 | Reele et al. |
| 5,907,815 | A | 5/1999 | Grimm et al. |
| 6,188,917 | B1 | 2/2001 | Laureanti |
| 6,201,867 | B1 | 3/2001 | Koike |

(Continued)

FOREIGN PATENT DOCUMENTS

| EP | 1871075 A1 | 12/2007 |
|---|---|---|
| WO | 9421058 A1 | 9/1994 |

(Continued)

*Primary Examiner* — Amancio Gonzalez
(74) *Attorney, Agent, or Firm* — Soquel Group LLC

(57) ABSTRACT

A communication system including a communication system, including a modular cell phone, including a baseband modem for connecting to a core mobile network via a cellular network, and a connector for physically connecting the modular cell phone to a port of a mobile electronic device, and a mobile electronic device, including a modem for connecting to the core mobile network via an IP access network, a port for physically connecting the modular cell phone to the mobile electronic device, and a connection enhancer for receiving a connection of an ongoing cellular phone call, between the modular cell phone and the core mobile network via the cellular network, and seamlessly handing over the ongoing phone call to a voice over IP connection, between the mobile electronic device and the core mobile network via the IP access network, in response to the modular cell phone being connected with the mobile electronic device port. A method is also described and claimed.

18 Claims, 10 Drawing Sheets

(56) References Cited

U.S. PATENT DOCUMENTS

| | | |
|---|---|---|
| 6,243,578 B1 | 6/2001 | Koike |
| 6,477,357 B1 | 11/2002 | Cook |
| 6,516,202 B1 | 2/2003 | Hawkins et al. |
| 6,640,113 B1 | 10/2003 | Shin et al. |
| 6,690,947 B1 | 2/2004 | Tom |
| 6,751,474 B1 | 6/2004 | Lin et al. |
| 6,898,283 B2 | 5/2005 | Wycherley et al. |
| 6,907,264 B1 | 6/2005 | Sterkel |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 7,424,288 B2 * | 9/2008 | Jung et al. ............. 455/416 |
| 7,477,919 B2 | 1/2009 | Warren |
| 7,515,937 B2 | 4/2009 | Lee |
| 8,019,279 B2 * | 9/2011 | Bauchot et al. ........... 455/41.2 |
| 2002/0090980 A1 | 7/2002 | Wilcox et al. |
| 2002/0151327 A1 | 10/2002 | Levitt |
| 2003/0028606 A1 * | 2/2003 | Koopmans et al. ......... 709/206 |
| 2004/0028009 A1 * | 2/2004 | Dorenbosch et al. ....... 370/329 |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2005/0233749 A1 | 10/2005 | Karaoguz et al. |
| 2005/0286466 A1 * | 12/2005 | Tagg et al. ............... 370/329 |
| 2006/0003804 A1 | 1/2006 | Liu |
| 2006/0105722 A1 | 5/2006 | Kumar |
| 2006/0116113 A1 | 6/2006 | Gass |
| 2006/0116127 A1 * | 6/2006 | Wilhoite et al. ............ 455/442 |
| 2006/0153198 A1 * | 7/2006 | Chadha ................... 370/395.2 |
| 2006/0183478 A1 * | 8/2006 | Jagadeesan et al. ......... 455/436 |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0167167 A1 | 7/2007 | Jiang |
| 2007/0175994 A1 | 8/2007 | Fruhauf |
| 2007/0189218 A1 * | 8/2007 | Oba et al. ................ 370/331 |
| 2007/0288583 A1 | 12/2007 | Rensin et al. |
| 2008/0009325 A1 | 1/2008 | Zinn et al. |
| 2008/0031201 A1 | 2/2008 | Lee |
| 2008/0040354 A1 | 2/2008 | Ray et al. |
| 2008/0140886 A1 | 6/2008 | Izutsu |
| 2009/0023442 A1 * | 1/2009 | Ahmed et al. ............ 455/426.2 |
| 2009/0147758 A1 | 6/2009 | Kumar |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

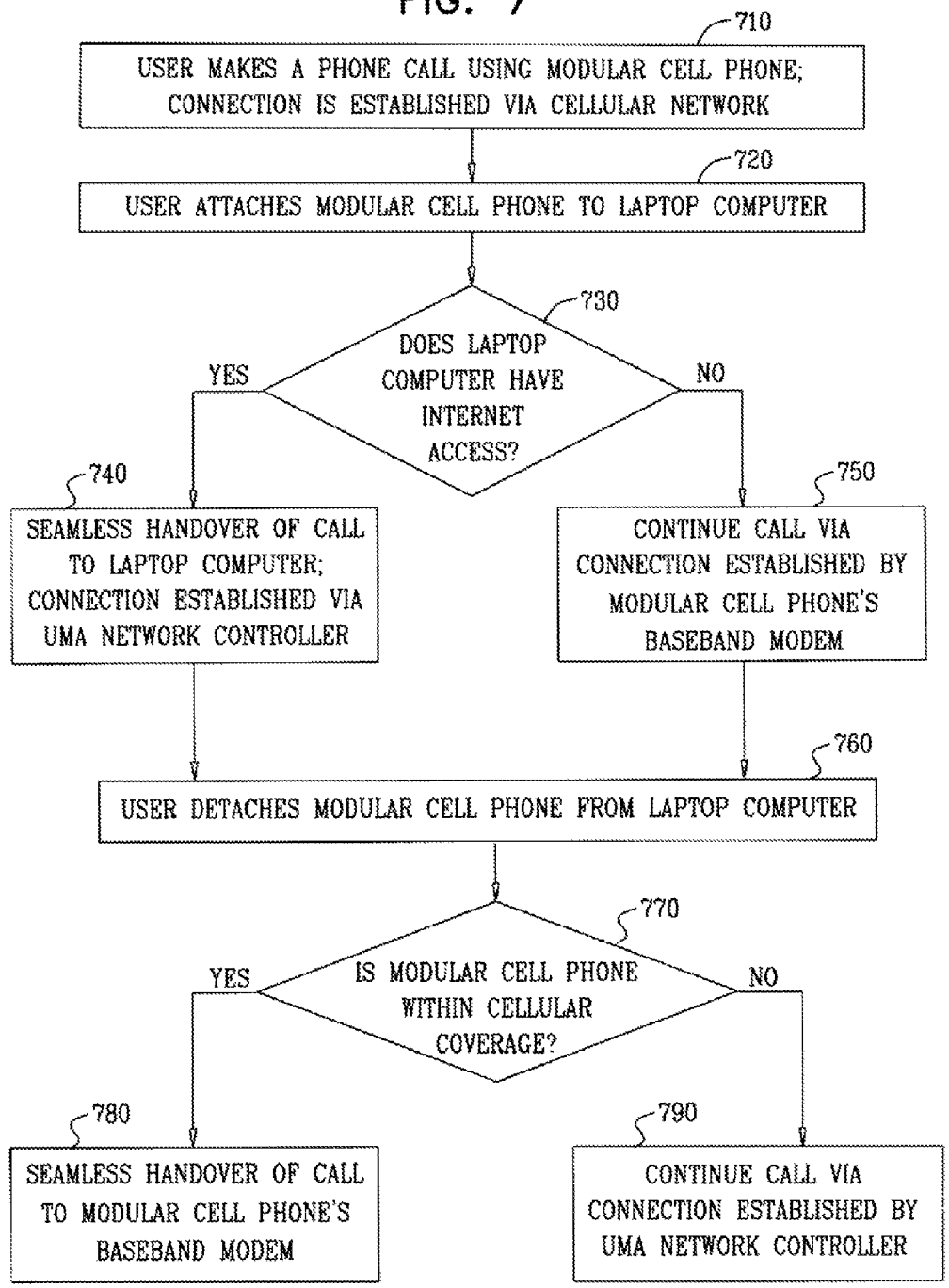

FIG. 8

| Location of UMA client modules in an embodiment of the present invention (cell phone+laptop computer) | | |
|---|---|---|
| Modules | Function | Location |
| Core UMA Protocol | Set of core messages responsible for managing and maintaining an active UMA session. Resides within the cell phone baseband stack. | Resides in cell phone |
| IP Interface | Manages the mobility of the cell phone and interfaces with the Wi-Fi subsystem. Responsible for monitoring handover triggers, such as RSSI and packet/link quality. If and when a handover event happens, the IP interface module communicates with the Core UMA Protocol module to execute the event. | Divided between cell phone and laptop computer |
| IPSec | Establishes and maintains the UMA IPSec tunnel. | Resides in laptop computer |
| Audio Processing | VoIP audio processing capabilities to overcome issues common to a VoIP session. (Transporting mobile voice traffic over a UMA tunnel is generally a VoIP operation.) | Resides in laptop computer. May also reside in cell phone |

| | Modifications to standard GSM protocol stack for an embodiment of the present invention | |
|---|---|---|
| | Standard UMA cell phone | Modifications for embodiment of present invention (modular cell phone + laptop computer) |
| UMA Client | UMA client is embedded in the cell phone's baseband modem. | UMA client is embedded in the cell phone and in the laptop computer (as indicated in FIG. 8). |
| Wi-Fi Management | UMA client evaluates Wi-Fi radio network, monitors Wi-Fi for appropriate triggers, establishes hand in/out requests, and manages the transition process. | Wi-Fi and LAN management embedded in laptop computer, and not in the cell phone. |
| Wi-Fi Access Points | Cell phone contains a profile of known Wi-Fi access points (APs). The Wi-Fi radio in the cell phone periodically scans to determine if the profiled APs are within range. If an AP is within range, and handover thresholds are met, then the hand-in process begins. | Physical or wireless connection between cell phone and laptop computer triggers IP-access scanning. |
| Domain Name | A fully qualified domain name (FQDN) is stored in the cell phone. The FQDN abstracts the IP address of the UNC in the network. The cell phone performs a domain name service (DNS) look-up of the FQDN to establish the address of the UNC's security gateway element. | The FQDN is stored in the laptop computer. |

FIG. 9

MODULAR CELL PHONE FOR FIXED MOBILE CONVERGENCE

PRIORITY REFERENCE TO RELATED APPLICATIONS

This application claims benefit of U.S. Provisional Application No. 61/043,179, entitled MODULAR CELL PHONE FOR FIXED MOBILE CONVERGENCE, filed on Apr. 8, 2008 by inventors Itay Sherman, Eyal Bychkov and Uri Ron.

FIELD OF THE INVENTION

The field of the present invention is cellular and voice over IP (VoIP) communication.

BACKGROUND OF THE INVENTION

Technologies for Fixed Mobile Convergence (FMC) have been emerging in recent years, with the aim of providing a single phone for both fixed and mobile services, where the phone switches between networks ad hoc. Unlicensed Mobile Access (UMA) and the IP Multimedia Subsystem (IMS) are standards that support FMC. In this regard, reference is made to FIG. 1, which is a prior art illustration of a system having a mobile core network and devices that access the network, in conformance with the UMA standard.

Generally FMC technology uses "dual mode handsets". Dual mode handsets are wireless phones that include both Wi-Fi radios, for local area access, and cellular radios, for wide area access. The Wi-Fi radio accesses wireless LANs in homes, offices and public hot spots, and the cellular radio accesses cellular networks. During a phone call, a dual mode handset monitors its location for the presence of Wi-Fi and cellular services, and selects the "better" access mode based on signal strength and other criteria. As a user moves between cellular and Wi-Fi coverage areas, the handset automatically switches between Wi-Fi and cellular access modes. A make-before-break handoff procedure ensures a seamless transition.

SUMMARY OF THE DESCRIPTION

Aspects of the present invention relate to fixed mobile convergence using a modular cell phone that connects with a mobile electronic device, such as a laptop computer. The modular cell phone has connectivity via one or more cellular networks, for making phone calls. The mobile electronic device has Internet connectivity, which may be used for making voice over IP phone calls.

Cellular connectivity has an advantage of being more ubiquitous than Internet connectivity. There are many locations and situations where Internet connectivity is not available, and nevertheless cellular connectivity is available.

Internet connectivity has an advantage of being inexpensive or free, whereas cellular connectivity requires a user to subscribe to a cellular service provider.

Using embodiments of the present invention, if the modular cell phone is connected with the mobile electronic device during an ongoing phone call, the phone call connection is seamlessly handed over to the mobile electronic device. If the modular cell phone is subsequently disconnected from the mobile electric device during the phone call, then the phone call connection is seamlessly handed back to the modular cell phone. As such, the user of the modular cell phone enjoys the "best of both worlds" while an ongoing phone call is taking place; namely, free VoIP during the time of the call that an Internet connection is available, and cellular connection during the time of the call that an Internet connection is not available.

There is thus provided in accordance with an embodiment of the present invention a communication system, including a modular cell phone, including a baseband modem for connecting to a core mobile network via a cellular network, and a connector for physically connecting the modular cell phone to a port of a mobile electronic device, and a mobile electronic device, including a modem for connecting to the core mobile network via an IP access network, a port for physically connecting the modular cell phone to the mobile electronic device, and a connection enhancer for receiving a connection of an ongoing cellular phone call, between the modular cell phone and the core mobile network via the cellular network, and seamlessly handing over the ongoing phone call to a voice over IP connection, between the mobile electronic device and the core mobile network via the IP access network, in response to the modular cell phone being connected with the mobile electronic device port.

There is additionally provided in accordance with an embodiment of the present invention a method for communication, including receiving a connection of an ongoing cellular phone call, between a modular cell phone and a core mobile network via a cellular network, and seamlessly handing over the ongoing phone call to a voice over IP connection, between a laptop computer and the core mobile network via an IP access network, in response to the modular cell phone being connected with the laptop computer.

There is further provided in accordance with an embodiment of the present invention a laptop computer, including a modem for connecting to a core mobile network via an IP access network, a port for physically connecting a modular cell phone to the laptop computer, and a connection enhancer for receiving a connection of an ongoing cellular phone call, between the modular cell phone and the core mobile network via a cellular network, and seamlessly handing over the ongoing phone call to a voice over IP connection, between the laptop computer and the core mobile network via the IP access network, in response to the modular cell phone being connected with the port.

BRIEF DESCRIPTION OF THE DRAWINGS

The present invention will be more fully understood and appreciated from the following detailed description, taken in conjunction with the drawings in which:

FIG. 7 is a simplified flowchart of switching the connection for a phone call between a cellular network and an IP network, according to whether or not the modular cell phone of FIG. 2 is in communication with the laptop computer of FIG. 2, in accordance with an embodiment of the present invention;

FIG. 8 is a table summarizing the functions and locations of modules of a UMA client for implementing an embodiment of the present invention; and FIG. 9 is a table summarizing modification made to a conventional GSM protocol stack for implementing an embodiment of the present invention.

DETAILED DESCRIPTION

Aspects of the present invention relate to a modular cell phone that interoperates with a mobile electronic device, such as a laptop computer. The modular cell phone has cellular connectivity, such as GSM/GPRS connectivity; and the mobile electronic device has Internet connectivity. When the modular cell phone is attached to the mobile electronic device, the resulting combined system provides dual phone capabilities.

Figure 1:
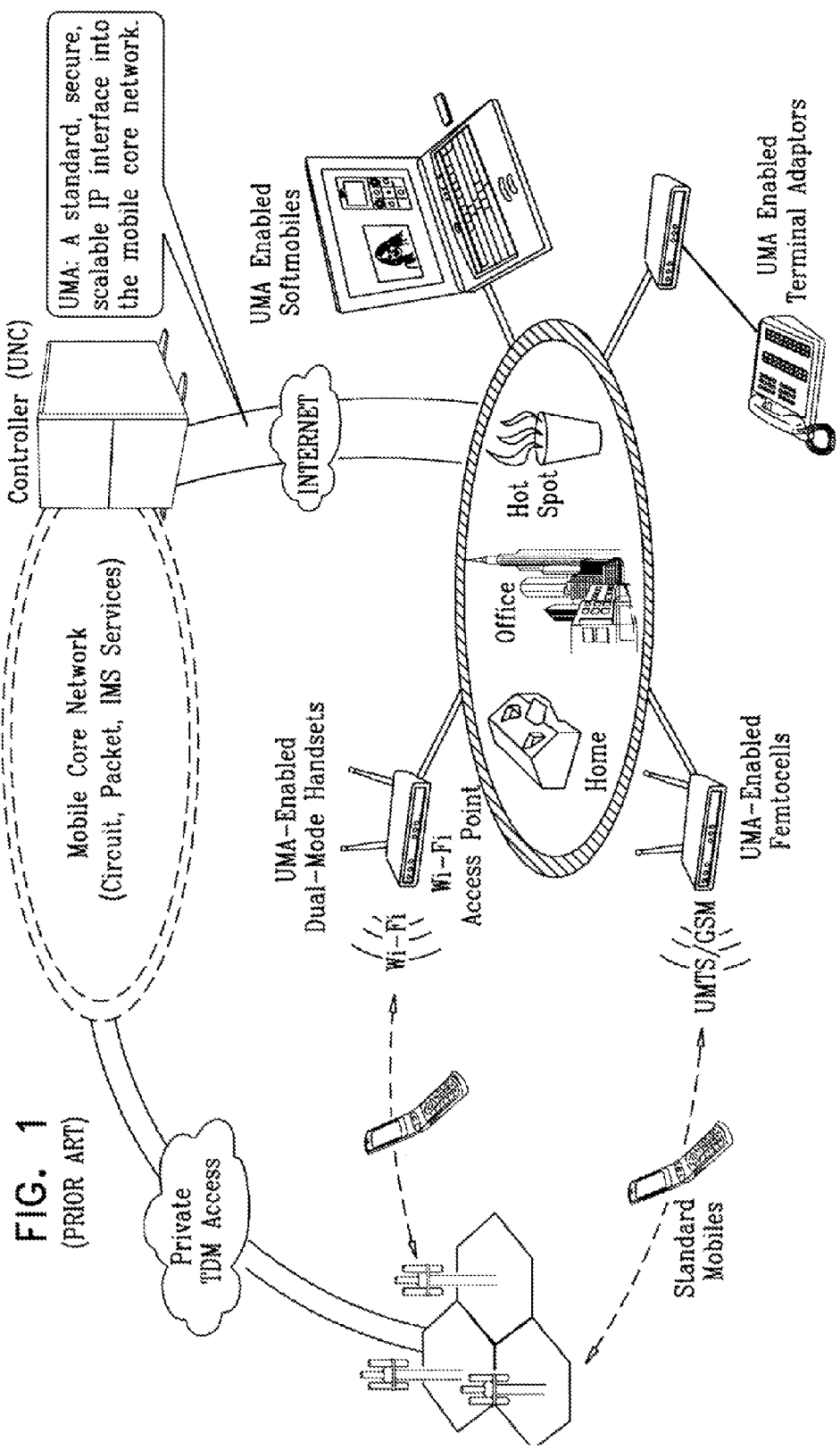
FIG. 1 is a prior art illustration of a system of a mobile core network and devices that access the network, in conformance with the UMA standard.
Figure 2:
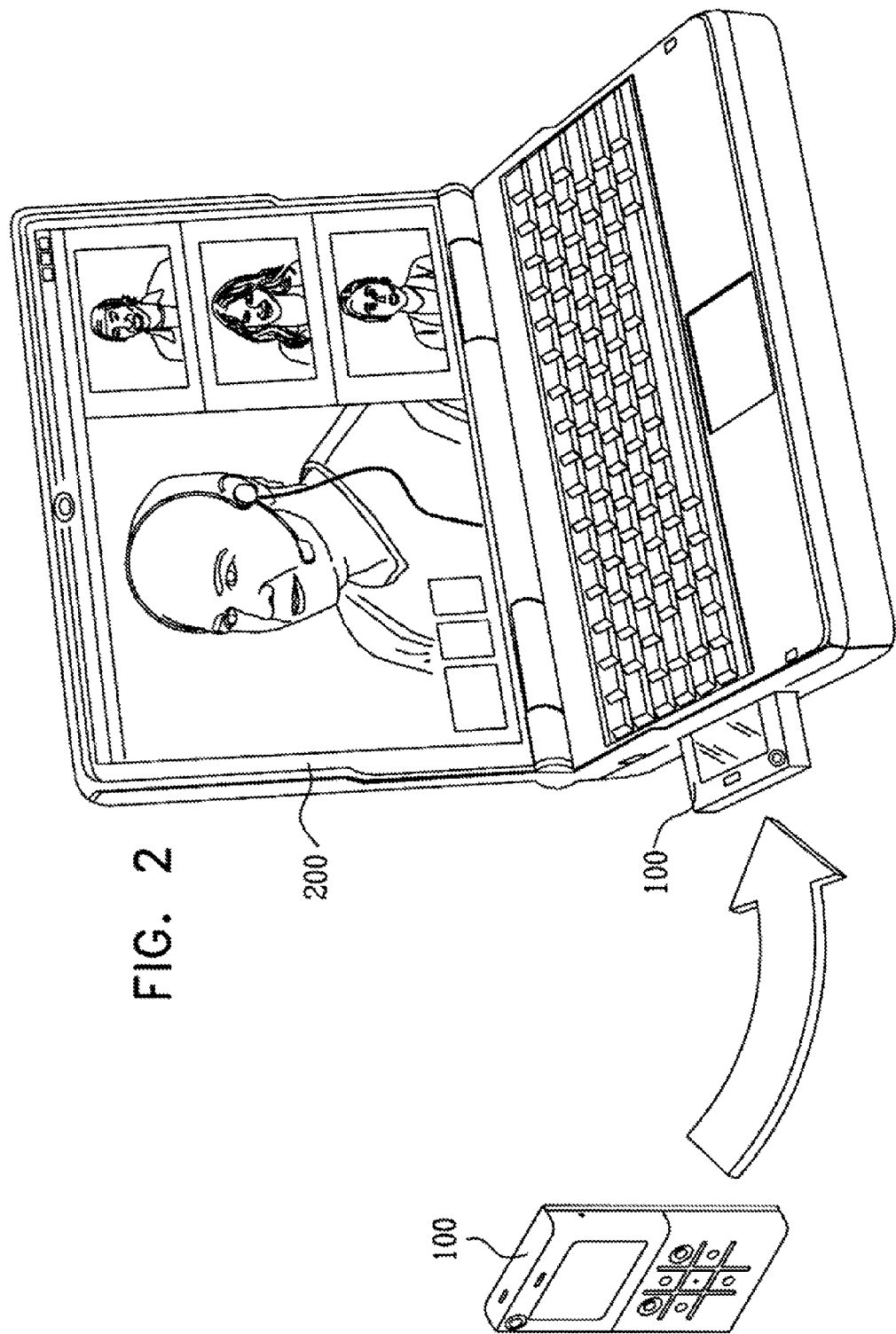
FIG. 2 is an illustration of a modular cell phone that attaches to a laptop computer, in accordance with an embodiment of the present invention.

In this regard, reference is now made to FIG. 2, which is an illustration of a modular cell phone 100 that connects to a laptop computer 200, in accordance with an embodiment of the present invention. As shown in FIG. 2, modular cell phone 100 may be physically attached to laptop computer 200, or not physically attached but within proximity of short range wireless communication. Whether modular cell phone 100 and laptop computer 200 are connected physically or wirelessly, modular cell phone 100 enhances the capabilities of laptop computer 200, and laptop computer 200 enhances the capabilities of modular cell phone 100, as described hereinbelow.

Figure 3:
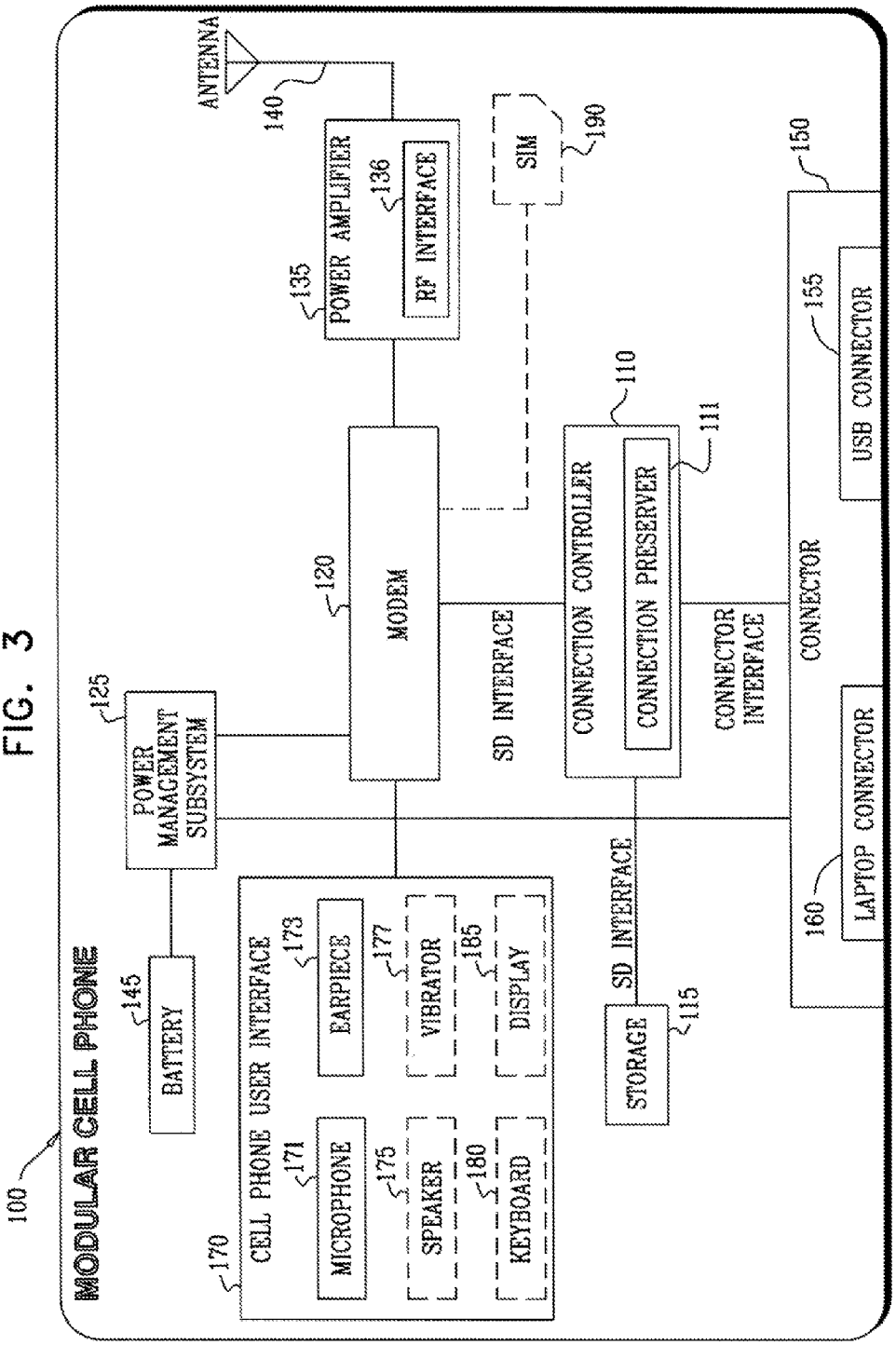
FIG. 3 is a simplified block diagram of the modular cell phone of FIG. 2, in accordance with an embodiment of the present invention.

Reference is now made to FIG. 3, which is a simplified block diagram of modular cell phone 100, in accordance with an embodiment of the present invention. Modular cell phone 100 includes six primary components, as follows: a connection controller 110, a memory storage 115, a base band modem 120 for sending and receiving voice and data communications, a power management subsystem 125, a power amplifier 135 and a user interface 170.

Connection controller 110 executes programmed instructions that control the data flow between modular cell phone 100 and laptop computer 200. Modem 120 controls the wireless communication functionality of modular cell phone 100. In addition to enabling cellular communication, modem 120 also enables modular cell phone 100 with short range wireless communication, including inter alia one or more of Dedicated Short Range Communication (DSRC), Bluetooth, WiFi, ZigBee, Radio Frequency Identification (RFID) and Near Field Communication (NFC).

Power management subsystem 125 includes circuitry for charging a battery 145. Power amplifier 135 includes a radio frequency (RF) interface 136, and is connected to an internal antenna 140. User interface 170 includes a microphone 171 and an earpiece 173. User interface 170 also includes an optional speaker 175, an optional vibrator 177, an optional keyboard 180 and an optional display 185. It will be appreciated by those skilled in the art that user interface 170 may include additional components.

Modular cell phone 100 includes a connector 150, which further includes a USB connector 155 and a laptop connector 160 for physically connecting modular cell phone 100 to laptop computer 200. Modular cell phone 100 optionally includes a subscriber identification module (SIM) 190.

In accordance with an embodiment of the present invention, the interface between connection controller 110 and storage 115, and the interface between connection controller 110 and modem 120 are SD interfaces. The interface between connection controller 110 and laptop connector 160 is a special purpose connector interface.

Connection controller 110 includes a connection preserver 111, for handing over an ongoing phone call from laptop computer 200 to modular cell phone 100. Connection preserver 111 receives a connection for an ongoing voice over IP phone call taking place via laptop computer 200, and seamlessly hands the phone call over to modular cell phone 100 for continuation as a cellular phone call.

Figure 4:
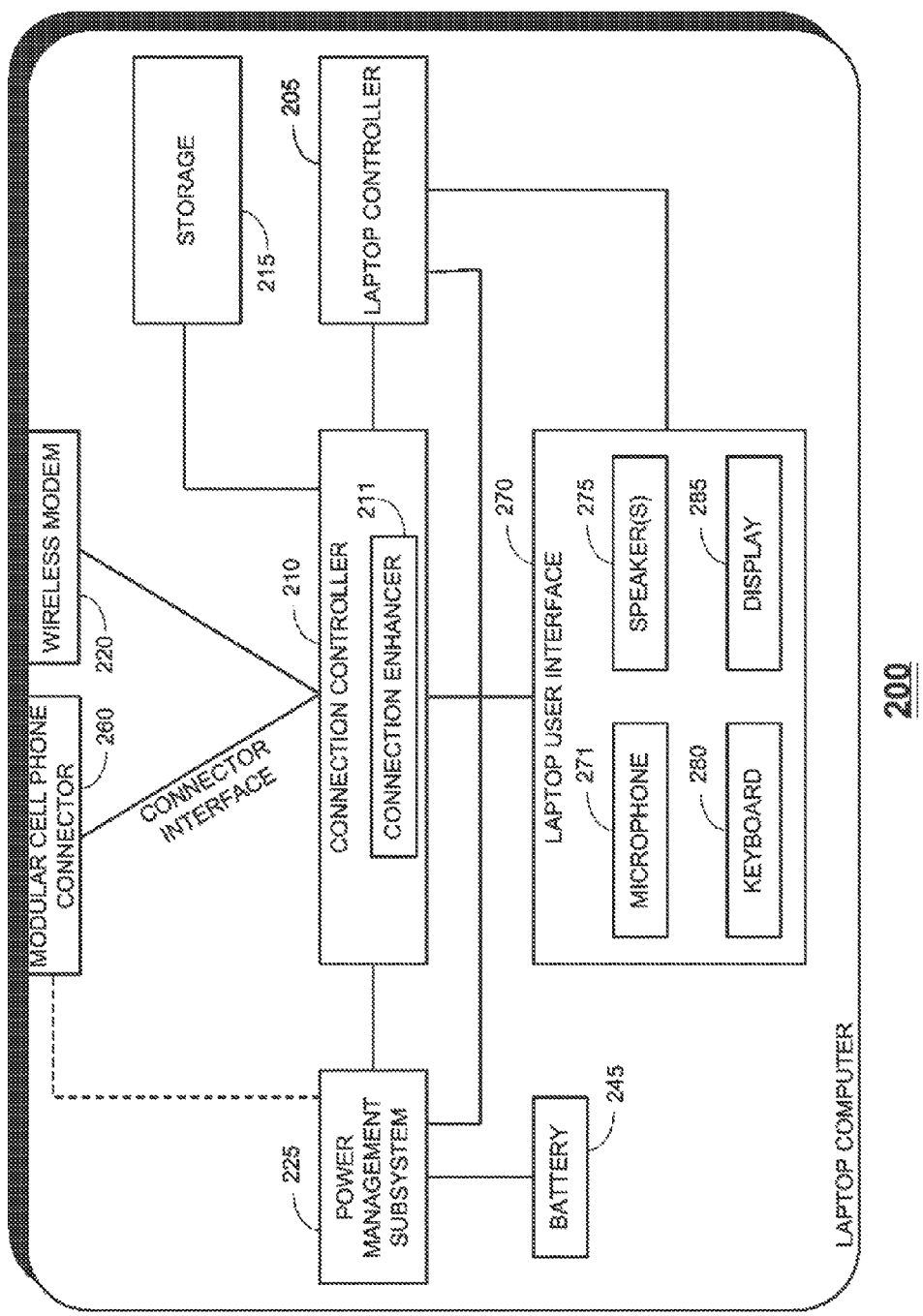
FIG. 4 is a simplified block diagram of the laptop computer of FIG. 2, in accordance with an embodiment of the present invention.

Reference is now made to FIG. 4, which is a simplified block diagram of laptop computer 200, in accordance with an embodiment of the present invention. Laptop computer 200 includes six primary components, as follows: a laptop controller 205, a connection controller 210, a memory storage 215, a wireless modem 220, a power management system 225 and a battery 245. Laptop computer includes a modular cell phone connector 260 for physically connecting modular cell phone 100 to laptop computer 200.

Laptop computer 200 includes a user interface 270 including a microphone 271, mono or stereo speakers 275, a keyboard 280 and a display 285. It will be appreciated by those skilled in the art that user interface 270 may include additional components.

As shown in FIG. 4, connector controller 210 includes a connection enhancer 211, for handing over a connection for an ongoing phone call via modular cell phone 100 to laptop computer 200. Connection enhancer 211 receives a connection for an ongoing cellular phone call, and seamlessly hands the phone call over to a voice over IP connection.

Each of modular cell phone 100 and laptop computer 200 is able to operate independently of the other. Modular cell phone 100 operates as a cell phone, and laptop computer 200 operates as a computer with an Internet connection. In this regard, reference is now made to FIG. 5, which is a simplified block diagram of modular cell phone 100 and laptop computer 200 operating independently of one another, whereby modular cell phone 100 uses a cellular network 310 to connect to a core mobile network 320, and laptop computer 200 uses an IP access network 330 to connect to core mobile network 320, in accordance with an embodiment of the present invention.

Figure 5:
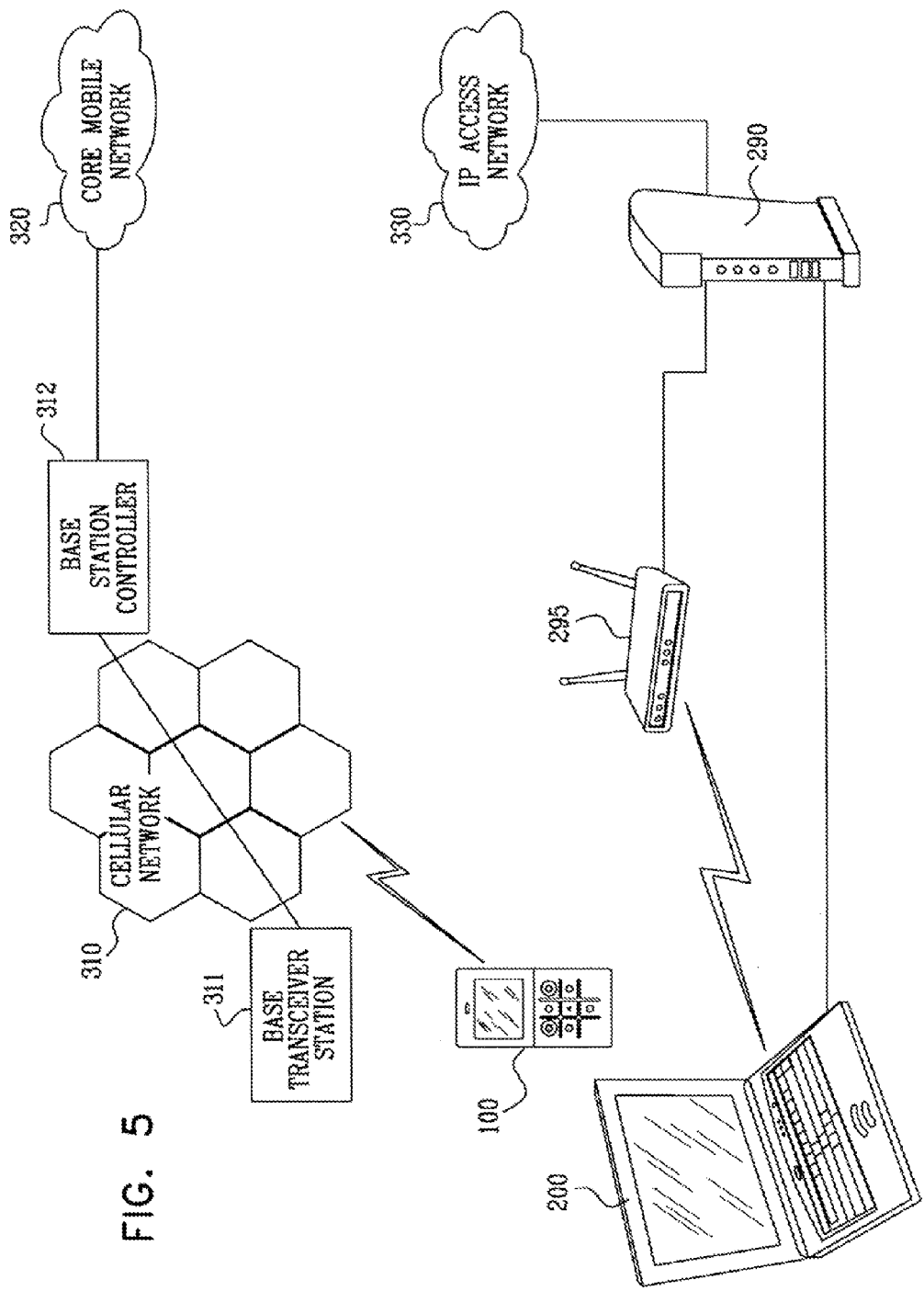
FIG. 5 is a simplified block diagram of the modular cell phone and the laptop computer of FIG. 2 operating independently of one another, whereby the modular cell phone uses a cellular network and the laptop computer uses an Internet connection, in accordance with an embodiment of the present invention.
Figure 6A:
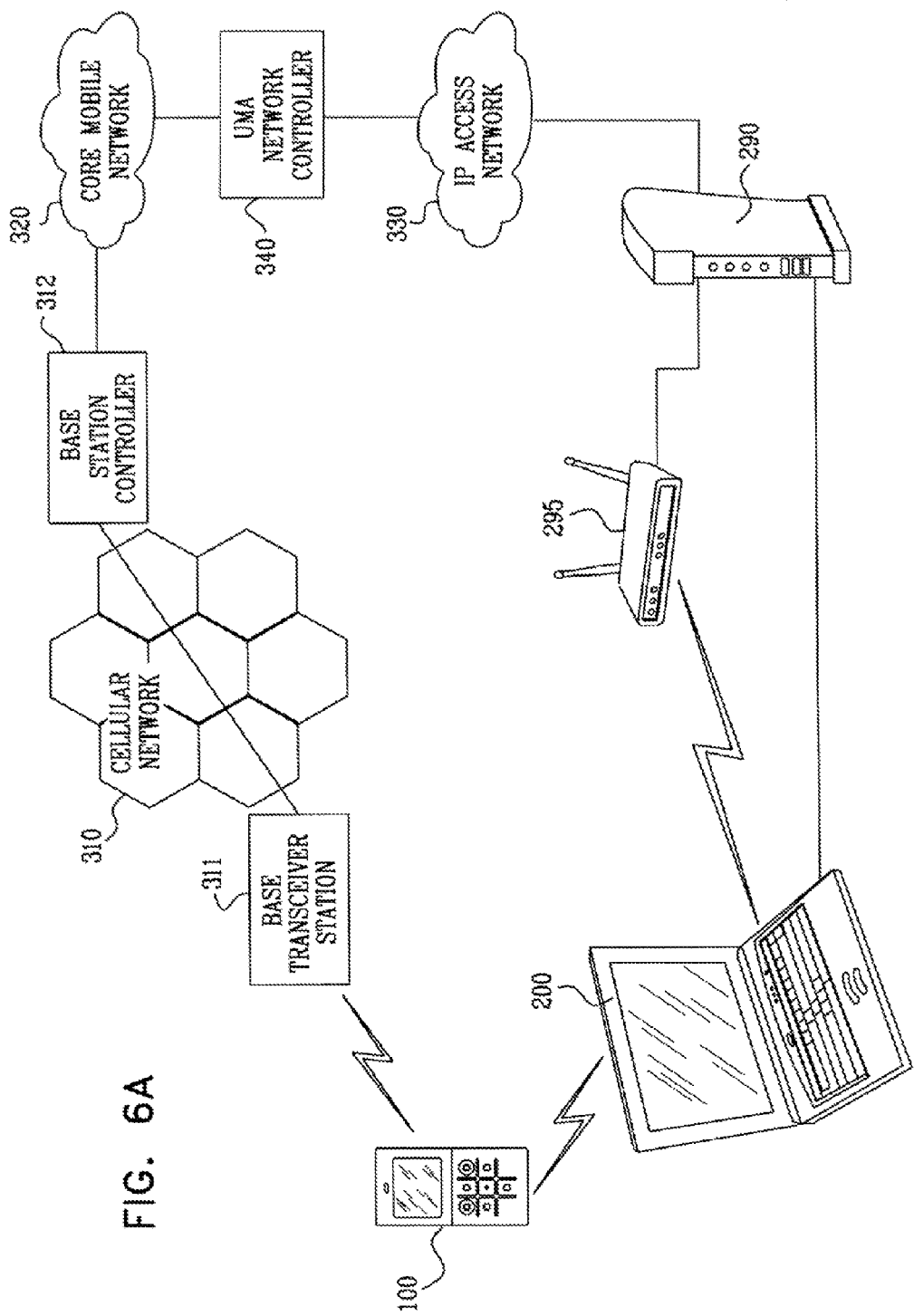
FIG. 6A, which is a simplified block diagram of the modular cell phone and the laptop computer of FIG. 2 operating jointly to conduct a phone call when the modular cell phone is in wireless communication with the laptop computer, in accordance with an embodiment of the present invention.
Figure 6B:
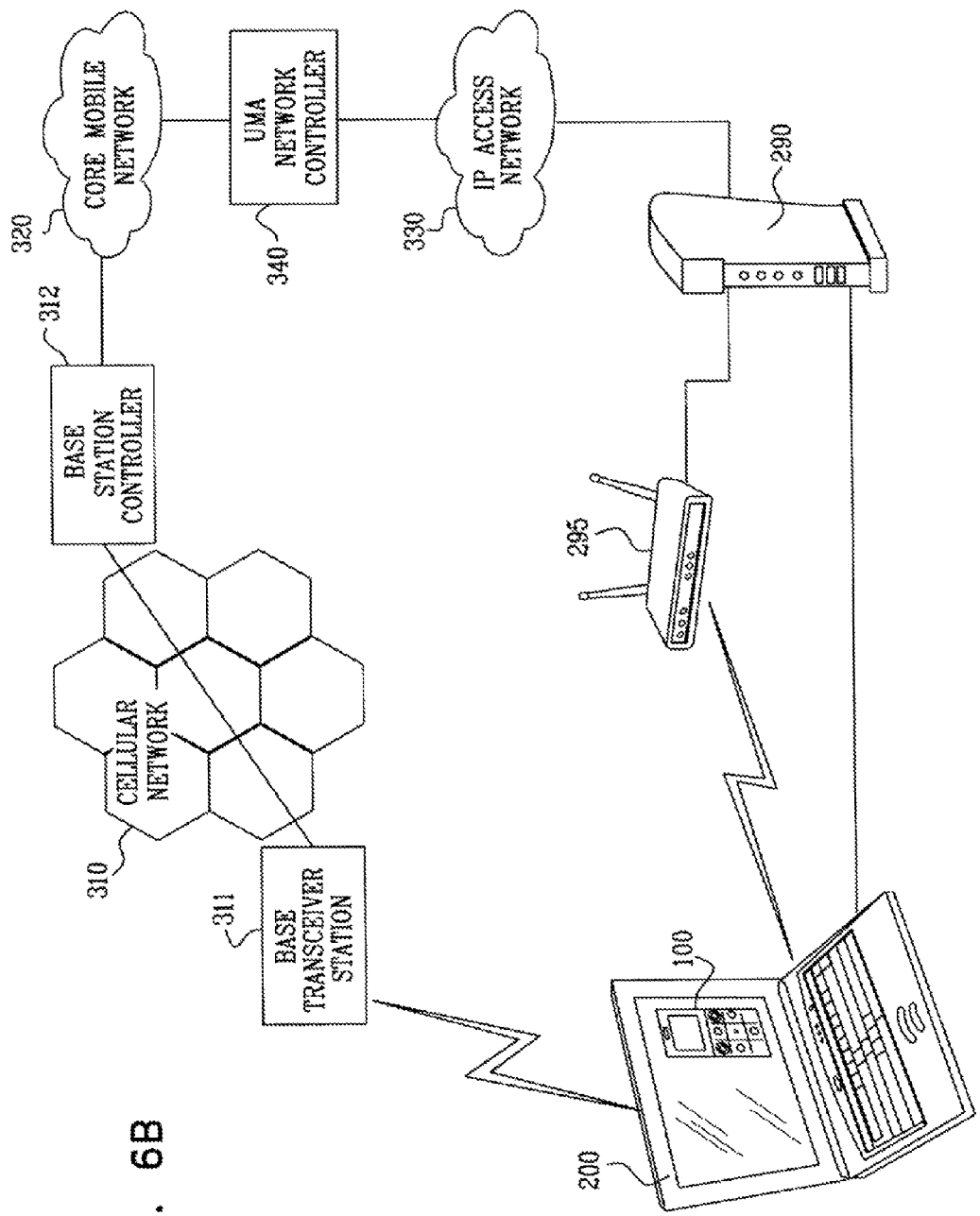
FIG. 6B is a simplified block diagram of the modular cell phone and the laptop computer of FIG. 2 operating jointly within the cellular network when the modular cell phone is physically attached to the laptop computer, in accordance with an embodiment of the present invention.

Cellular network 310 as shown in FIGS. 5, 6A and 6B may be a General Packet Radio Service (GPRS) network, a Code Division Multiple Access (CDMA) network, an IEEE 802.11b WiFi network, or another such wireless network. Cellular network 310 includes a base transceiver station (BTS) 311, which terminates an over-the-air interface over which subscriber traffic is communicated to and from modular cell phone 100. Cellular network 310 also includes a base station controller (BSC) 312, which is a switching module that provides handoff functions and power level control in base transceiver stations.

As shown in FIG. 5, laptop computer 200 connects to IP access network 330 either (i) via a modem 290, or (ii) via a router 295 and modem 290. In the former case, laptop computer 200 is physically connected to modem 290 via an Ethernet cable. In the latter case, laptop computer 200 is connected to router 295 via a wireless connection, such as a WiFi connection, and router 295 is physically connected to modem 290.

Although laptop computer 200 can operate independently of modular cell phone 100, when modular cell phone 100 is in physical or wireless communication with laptop computer 200, laptop computer 200 may enhance modular cell phone 100 by establishing a connection via IP access network 330 for modular cell phone 100 to use. In this regard, reference is now made to FIGS. 6A and 6B, which are simplified block diagrams of modular cell phone 100 and laptop computer 200 operating jointly to conduct a phone call, in accordance with an embodiment of the present invention. FIG. 6A illustrates a communication system where modular cell phone 100 is in wireless communication with laptop computer 200, using a short range wireless connection. FIG. 6B illustrates a similar communication system where modular cell phone 100 is in physical communication with laptop computer 200. Modular cell phone 100 may connect to core mobile network 320 either (i) via cellular network 310, or (ii) via laptop computer 200 and IP access network 330. A UMA network controller 340 establishes a connection between IP access network 330 and core mobile network 320.

In accordance with an embodiment of the present invention, when modular cell phone 100 and laptop computer 200 are in wireless or physical communication with one another, and when laptop computer 200 has connectivity to IP access network 330, phone calls being conducted by modular cell phone 100 are handed over to laptop computer 200 for connection via UMA network controller 340.

Specifically, if modular cell phone 100 is coupled communicatively with laptop computer 200 while an ongoing phone call is taking place via modular cell phone 100, then the connection for the phone call is routed through laptop computer 200 and handed over to UMA network controller 340. However, if laptop computer 200 is not connected to an IP network, then the connection for the phone call remains via modular cell phone 100.

Similarly, if modular cell phone 100 is subsequently de-coupled from laptop computer 200 while the ongoing phone call is taking place, then the connection for the phone call is routed through the modular cell phone's baseband modem 120. In such case the ongoing phone call may be communicated via modular cell phone 100, using the short range wireless communication between modular cell phone 100 and laptop computer 200. However, if modular cell phone 100 is outside of its cellular coverage, then the connection for the ongoing phone call remains via laptop computer 200.

In this regard, reference is now made to FIG. 7, which is a simplified flowchart of switching the connection for a phone call between a cellular network and an IP network, according to whether or not modular cell phone 100 is in communication with laptop computer 200, in accordance with an embodiment of the present invention.

At step 710 a user makes a phone call using modular cell phone 100. The connection for the call is established via cellular network 310, using the cell phone's baseband modem 120. At step 720 the user attaches modular cell phone 100 to laptop computer 200.

At step 730 a determination is made whether or not laptop computer 200 has connectivity to IP access network 330. If so, then at step 740 the connection for the ongoing phone call is handed over seamlessly to laptop computer 200, and the connection for the call is established via UMA network controller 340. However, if it is determined at step 730 that laptop computer 200 does not have connectivity to IP access network 330, then at step 750 the call is continued using the connection via cellular network 310.

At step 760 the user detaches modular cell phone 100 from laptop computer 200. At step 770 a determination is made whether modular cell phone 100 is located within a cellular coverage zone. If so, then at step 780 the connection for the ongoing phone call is handed over seamlessly to the cell phone's baseband modem 120. Otherwise, if it is determined at step 770 that modular cell phone 100 is outside of a cellular coverage zone, then at step 790 the call is continued using its current connection.

Processing then continues at step 720 if the user subsequently re-attaches modular cell phone 100 to laptop computer 200.

Implementation Details

In accordance with an embodiment of the present invention, the systems illustrated in FIGS. 6A and 6B, for a combined modular cell phone+laptop computer, differ from a standard UMA cell phone in several ways. Generally, a dual-mode phone may have any of a plurality of hardware, software and firmware adaptations. In accordance with an embodiment of the present invention, portions of Wi-Fi hardware reside in the laptop computer instead of in the cell phone, and portions of the software and firmware that relate to the Wi-Fi hardware are modified, as described hereinbelow.

A first difference between an embodiment of the combined modular cell phone+laptop computer of the present invention and a standard UMA cell phone involves the location of various modules of a UMA client. In general, a UMA client executes the UMA protocol, and is responsible for monitoring Wi-Fi threshold levels, establishing an IPSec tunnel, and handling VoIP aspects of a UMA circuit voice session. Correspondingly, a UMA client includes four modules; namely, (i) a core UMA protocol, (ii) an IP interface, (iii) an IPSec module, and (iv) an audio processing module. For a standard UMA cell phone, modules (i)-(iv) reside in the cell phone. However, for embodiments of the present invention, these modules are distributed between modular cell phone 100 and laptop computer 200.

In this regard, reference is now made to FIG. 8, which is a table summarizing the functions and locations of UMA client modules (i)-(iv) for implementing an embodiment of the present invention. As shown in the table of FIG. 8, the core UMA protocol resides in modular cell phone 100, the IP interface is distributed between modular cell phone 100 and laptop computer 200, the IPSec module resides in laptop computer 200, and the audio processing module resides in laptop computer 200, and may also reside in modular cell phone 100.

Specifically, in an embodiment where modular cell phone 100 connects to laptop computer 200 via Bluetooth wireless communication, the audio processing module (iv) also resides in modular cell phone 100. In this embodiment, cell phone 100 is used as a Bluetooth earpiece. If a call is ongoing via the laptop computer's IP access, and modular cell phone 100 is connected to the laptop computer via Bluetooth, then modular cell phone 100 becomes a Bluetooth earpiece for the call. Symbolically,

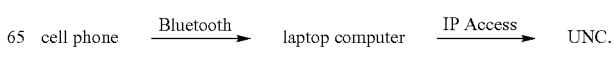

Such an embodiment is implemented by defining cell phone 100 as a headset of laptop computer 200, and modifying the Bluetooth headset profile for laptop computer 200 accordingly.

A second difference between an embodiment of the combined modular cell phone+laptop computer of the present invention and a standard UMA cell phone involves the GSM protocol stack. In this regard, reference is now made to FIG. 9, which is a table summarizing modifications that are made to a conventional GSM protocol stack for implementing an embodiment of the present invention. Shown in the table of FIG. 9 are modifications made to the UMA client, Wi-Fi management, Wi-Fi access points and domain name.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication system, comprising:
   a single-mode modular cell phone, comprising:
      a baseband modem for connecting to a core mobile network via a cellular network;
      an unlicensed mobile access client for executing a mobile access protocol; and
      a connector for physically attaching the modular cell phone to a port of a mobile electronic device; and
   a mobile electronic device, distinct from said modular cell phone, comprising:
      a modem for connecting to the core mobile network via an IP access network;
      a port for physically attaching said modular cell phone;
      an unlicensed mobile access client comprising an IP security module;
      an attachment detector for detecting that said modular cell phone has been physically attached to or physically detached from said port;
      an access point scanner coupled with said connection detector for responding to said attachment detector detecting physical attachment by determining if a wireless access point is within range; and
      a connection enhancer coupled with said access point scanner for responding to said access point scanner determining that a wireless access point is within range by receiving a connection of an ongoing cellular phone call, between said modular cell phone and the core mobile network via the cellular network, and seamlessly handing over the ongoing cellular phone call to a voice over IP connection, between the mobile electronic device and the core mobile network via the IP access network and via a mobile access network controller.

2. The communication system of claim 1 wherein said connection enhancer seamlessly hands over the ongoing cellular phone call to a voice over IP connection only if said connection enhancer confirms that said mobile electronic device is connected to the IP access network.

3. The communication system of claim 1, wherein said modular cell phone further comprises a connection preserver for responding to said attachment detector detecting physical detachment by receiving a connection of an ongoing voice over IP phone call, between said mobile electronic device and the core mobile network via the IP access network, and seamlessly handing over the ongoing voice over IP phone call to a cellular connection, between said modular cell phone and the core mobile network via the cellular network.

4. The communication system of claim 3 wherein said connection preserver seamlessly hands over the ongoing voice over IP phone call to a cellular connection only if said connection preserver confirms that said modular cell phone is located within a cellular coverage zone.

5. The communication system of claim 1 wherein said mobile electronic device modem comprises a wireless modem that communicates with said modular cell phone within a short range, and wherein said connection enhancer hands over the ongoing cellular phone call to a voice over IP connection, in response to said mobile electronic device being in short range wireless communication with said modular cell phone.

6. The communication system of claim 1 wherein said mobile electronic device modem comprises a Wi-Fi radio.

7. The communication system of claim 6 wherein said access point scanner determines if said mobile electronic device is within range of any of a plurality of known Wi-Fi access points.

8. The communication system of claim 1 wherein said mobile electronic device comprises a laptop computer.

9. The communication system of claim 1 wherein the mobile access network controller comprises an Unlicensed Mobile Access (UMA) network controller.

10. A method for communication, comprising:
    receiving a connection of an ongoing cellular phone call, between a single-mode modular cell phone and a core mobile network via a cellular network;
    determining if a wireless access point is within range, in response to the modular cell phone being physically attached to a laptop computer; and
    seamlessly handing over the ongoing cellular phone call to a voice over IP connection, between the laptop computer and the core mobile network via an IP access network and via a mobile access network controller, in response to determining that a wireless access point is within range by said determining.

11. The method of claim 10 wherein said seamlessly handing over to a voice over IP connection is conditional upon confirming that the laptop computer is connected to the IP access network.

12. The method of claim 11 further comprising:
    receiving a connection of an ongoing voice over IP phone call, between the laptop computer and the core mobile network via the IP access network; and
    seamlessly handing over the ongoing voice over IP phone call to a cellular connection, between the modular cell phone and the core mobile network via the cellular network, in response to the modular cell phone being physical detached from the laptop computer.

13. The method of claim 12 wherein said seamlessly handing over to a cellular connection is conditional upon confirming that the modular cell phone is located within a cellular coverage zone.

14. A laptop computer, comprising:
    a modem for connecting to a core mobile network via an IP access network;
    a port for physically attaching a single-mode modular cell phone to the laptop computer;
    an unlicensed mobile access client comprising an IP security module;
    an attachment detector for detecting that the modular cell phone has been physically attached to said port;
    an access point scanner coupled with said attachment detector for responding to said connection detector detecting physical attachment by determining if a wireless access point is within range; and a connection enhancer coupled with said access point scanner for responding to said access point scanner determining that a wireless access point is within range by receiving a connection of an ongoing cellular phone call, between the modular cell phone and the core mobile network via a cellular network, and seamlessly handing over the ongoing cellular phone call to a voice over IP connection, between the laptop computer and the core mobile network via the IP access network and via a mobile access network controller.

15. The laptop computer of claim 14 wherein said connection enhancer seamlessly hands over the ongoing cellular phone call to a voice over IP connection only if said connection enhancer confirms that the laptop computer is connected to the IP access network.

16. The laptop computer of claim 14 wherein said modem communicates wirelessly with the modular cell phone within a short range, and wherein said connection enhancer hands over the ongoing cellular phone call to a voice over IP connection, in response to the laptop computer being in short range wireless communication with the modular cell phone.

17. A single-mode modular cell phone, comprising:
a baseband modem for connecting to a core mobile network via a cellular network;
an unlicensed mobile access client for executing a mobile access protocol;
a connector for physically attaching the modular cell phone to a port of a mobile electronic device;
a detachment detector for detecting that the modular cell phone has been physically detached from the port of the mobile electronic device; and
a connection preserver coupled with said detachment detector for responding to said detachment detector detecting physical detachment by receiving a connection of an ongoing voice over IP phone call, between the mobile electronic device and the core mobile network via the IP access network, and seamlessly handing over the voice over IP ongoing phone call to a cellular connection, between the modular cell phone and the core mobile network via the cellular network.

18. The modular cell phone of claim 17 wherein said connection preserver seamlessly hands over the ongoing voice over IP phone call to a cellular connection only if said connection preserver confirms that the modular cell phone is located within a cellular coverage zone.

* * * * *